US008237550B2

(12) United States Patent
Reichert et al.

(10) Patent No.: US 8,237,550 B2
(45) Date of Patent: Aug. 7, 2012

(54) ACTION USING SWITCHED DEVICE THAT TRANSMITS DATA

(75) Inventors: James T. Reichert, Kirkland, WA (US); Glenn T. Thrush, Kirkland, WA (US); David W. Baumert, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 12/045,718

(22) Filed: Mar. 11, 2008

(65) Prior Publication Data

US 2009/0231109 A1  Sep. 17, 2009

(51) Int. Cl.
| | |
|---|---|
| *H04Q 5/22* | (2006.01) |
| *G08C 19/16* | (2006.01) |
| *G08C 19/12* | (2006.01) |
| *G08B 23/00* | (2006.01) |
| *G08B 1/00* | (2006.01) |
| *G06F 17/00* | (2006.01) |
| *G06K 7/00* | (2006.01) |
| *H03C 1/52* | (2006.01) |
| *A01K 1/10* | (2006.01) |

(52) U.S. Cl. ............ 340/10.41; 340/10.1; 340/12.1; 340/13.1; 340/573.1; 340/309.7; 235/375; 235/435; 455/106; 119/51.01

(58) Field of Classification Search .............. 340/10.1, 340/10.2, 10.51, 10.5, 12.22, 12.23, 12.24, 340/12.51, 13.26, 13.21, 573.1, 309.7; 235/375, 235/435; 455/106; 119/51.01

See application file for complete search history.

(56) References Cited

U.S. PATENT DOCUMENTS

| | | | | |
|---|---|---|---|---|
| 6,285,295 | B1 * | 9/2001 | Casden | 340/12.24 |
| 6,340,931 | B1 * | 1/2002 | Harrison et al. | 340/572.1 |
| 6,477,274 | B1 * | 11/2002 | Kim et al. | 382/187 |
| 6,650,254 | B1 | 11/2003 | Rix | |
| 6,681,108 | B1 * | 1/2004 | Terry et al. | 455/412.2 |
| 6,806,808 | B1 | 10/2004 | Watters et al. | |
| 6,828,902 | B2 * | 12/2004 | Casden | 340/10.3 |
| 6,903,662 | B2 | 6/2005 | Rix et al. | |
| D514,584 | S | 2/2006 | Summit et al. | |
| 7,157,651 | B2 | 1/2007 | Rix et al. | |
| 7,167,078 | B2 * | 1/2007 | Pourchot | 340/5.61 |

(Continued)

FOREIGN PATENT DOCUMENTS

WO  06057864 A1  6/2006

OTHER PUBLICATIONS

Brocato, "Passive Wireless Sensor Tags", Sandia Report, SAND2006-1288, Unlimited Release, Printed Mar. 2006, pp. 1-20.

(Continued)

*Primary Examiner* — Daniel Wu
*Assistant Examiner* — Emily C Terrell

(57) ABSTRACT

A radio-frequency identification (RFID) device, or other type of device that transmits data in response to a broadcast of energy, may have a switch. The switch may allow an operator to signal whether the device will transmit data when energized. The switch could also allow an operator to select a particular item of data, or a combination of items of data, to be transmitted. Receiving data reflected from the device may signify an action to be performed, or may signify the fact that some physical action (e.g., pressing, by a human finger) has occurred with respect to the device. Thus, device that transmit data when energized may be used to direct the operation of other devices (e.g., by turning such other devices on or off), to implement tactilely-sensitive displays, or as part of other applications.

10 Claims, 5 Drawing Sheets

U.S. PATENT DOCUMENTS

| | | | |
|---|---|---|---|
| 7,683,888 B1* | 3/2010 | Kennedy | 345/173 |
| 2002/0067270 A1* | 6/2002 | Yarin et al. | 340/573.1 |
| 2003/0234718 A1* | 12/2003 | Fujisawa et al. | 340/5.1 |
| 2004/0077367 A1* | 4/2004 | Sama et al. | 455/518 |
| 2005/0057517 A1 | 3/2005 | Rix | |
| 2005/0083318 A1 | 4/2005 | Rix et al. | |
| 2005/0093374 A1* | 5/2005 | Connors et al. | 307/126 |
| 2005/0258066 A1* | 11/2005 | Conley | 206/538 |
| 2006/0139180 A1 | 6/2006 | Smith et al. | |
| 2006/0197497 A1* | 9/2006 | Wong et al. | 320/114 |
| 2006/0280149 A1 | 12/2006 | Kuhl et al. | |
| 2007/0014199 A1* | 1/2007 | Park et al. | 369/30.06 |
| 2007/0035382 A1* | 2/2007 | Lee et al. | 340/10.1 |
| 2007/0054616 A1 | 3/2007 | Culbert | |
| 2007/0108034 A1 | 5/2007 | Rix et al. | |
| 2007/0115124 A1 | 5/2007 | Brignone et al. | |
| 2007/0139216 A1 | 6/2007 | Breed | |
| 2007/0143162 A1* | 6/2007 | Keever et al. | 705/7 |
| 2007/0194945 A1* | 8/2007 | Atkinson | 340/825.72 |
| 2007/0200684 A1 | 8/2007 | Colby | |
| 2007/0200778 A1* | 8/2007 | Henty | 343/702 |
| 2007/0236851 A1 | 10/2007 | Shameli et al. | |
| 2007/0296583 A1 | 12/2007 | Rofougaran | |
| 2009/0128510 A1* | 5/2009 | Hagiwara | 345/173 |
| 2010/0265203 A1* | 10/2010 | Rofougaran | 345/174 |

OTHER PUBLICATIONS

Sample, et al., "Design of a Passively-Powered, Programmable Sensing Platform for UHF RFID Systems", IEEE International Conference on RFID, Mar. 26-28, 2007, pp. 1-8.

"Engadget", http://www.engadget.com/2008/02/02/lite-ons-moldable-mouse-takes-whatever-shape-you-want/, Dated: Feb. 2, 2008.

Case, Loyd, "Ergodex DX1 Redefines Input Devices", retrieved from <<http://www.extremetech.com/article2/0,1558,1555134,00.asp>>, ExtremeTech, dated Mar. 26, 2004, pp. 1-5.

Ergodex DX1 Product Description, retrieved from <<http://www.ergodex.com/content12.php>>, dated 2004-2008, pp. 1-3.

* cited by examiner

ACTION USING SWITCHED DEVICE THAT TRANSMITS DATA

BACKGROUND

Mechanisms that allow data to be communicated between two devices generally use power at both the transmitting and receiving ends (supplied through wall power or a battery), and a wired or wireless communication channel between the devices. Some devices, such as Radio Frequency Identification (RFID) devices, can send data outward without being tethered to a power source, and without what would normally be regarded as a communication channel between itself and the recipient of the data. Such devices are powered by energy that is broadcast (e.g., in the form of electromagnetic waves in the radio frequency, in the case of RFID). These devices reflect data in response to the broadcast of energy. The devices typically have a fixed item of data that is reflected when the device is energized. Switched versions of such devices have been proposed, where an energized device would either transmit data, or not, depending on whether the switch is open or closed.

One issue that arises is what types of applications can be made of switched devices that transmit data. Such devices could be used to implement a variety of functionalities. Systems that facilitate a broad range of uses of such data-transmitting devices generally have not been realized.

SUMMARY

A switched data-transmission device has one or more pieces of data that may be communicated, or not, based on the state of a switch. The data may be associated with the device in the sense that a particular device could be identified by its data. Each piece of data may be associated with a particular meaning, such as the intent to perform a particular action. A receiving component may receive data from several such devices and take action based on which data has been received. The device that communicates the data may be a device that communicates data without being tethered to a wired power source or a battery. The device could be a Radio Frequency Identification (RFID) device which uses energy in the form of electromagnetic waves to power the transmission of a piece of data, but the device could also be based on other technology. Thus, the device may communicate its piece of data, as well as the state of its switch, without being directly connected to a wired source or a battery.

The switch may be operable by physical activity. For example, pressing of the switch by a human finger may close a circuit. In this way, if the device is energized, it transmits its data when being pressed and transmits no data when not being pressed. The receiving component could poll devices by broadcasting energy at recurrent intervals and determining which data are reflected back. The reader could then look up a particular action or other meaning associated with the reflected data. For example, a particular piece of data could be assigned to be an on/off switch for a light, the letter "g" on a keyboard, the left button on a mouse, a panic button on a home alarm system, etc. The reader could then cause the action associated with the data to be taken. Closing of a switch may be done by human motion such as pressing on the device in which the switch is incorporated, thereby allowing the reflection of data to signify a human intent to do something. However, the switch could also be closed by any other physical action, whether human-initiated or not.

Data-transmission devices could be used to implement a variety of different applications, such as wireless/untethered on/off or multi-state switches, keyboards, tactilely-sensitive (touch-screen) displays, surface computing, etc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Certain devices, such as RFID devices, can be energized to transmit data without being tethered to a power source. Such a device may be referred to as a data-transmitting device, of which an RFID device is one example. These devices may be small and inexpensive. A switch may be applied to such a device, such that, when the device is energized, it transmits data if the switch is closed but not if the switch is open. Similarly, a device could store various different items of data, and a multi-way switch could allow selection of a specific item of data, or a specific combination of items of data, to be transmitted. The switch may be incorporated into the device in such a way that subtle actions—e.g., light finger pressure—may operate the switch. For example, an RFID device could take the form of a thin tag made of layers. The positioning of conductive and insulating material on the layers could be such that pressing on the device compresses the layers together and closes a switch, and releasing the pressure separates the layers and opens the switch. There are various possible applications that could be made of data-transmission device that is operable in this manner, and various ways of implementing such applications.

Figure 1:
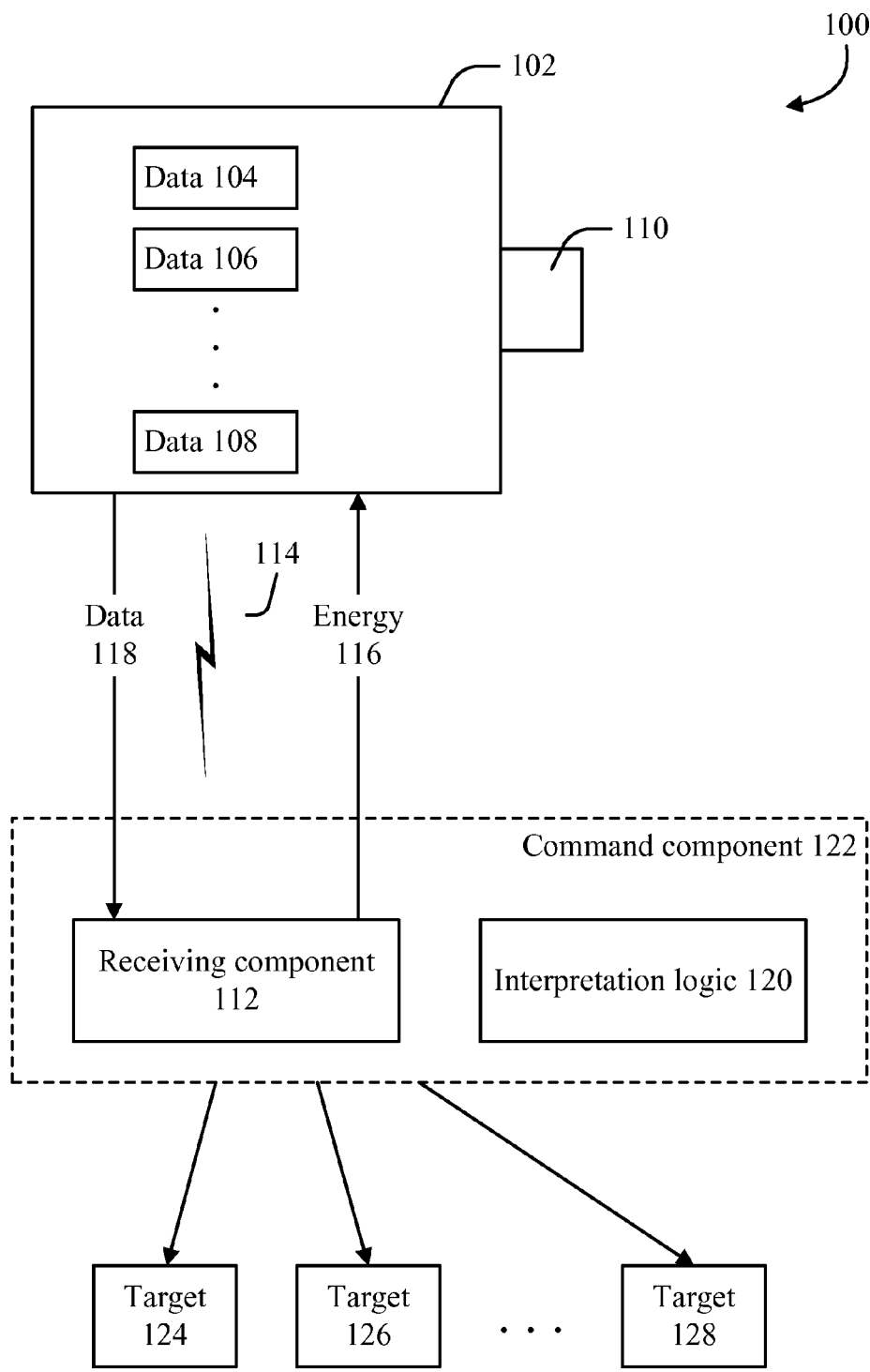
FIG. 1 is a block diagram of a system in which data-transmission devices may be used to signify information and/or cause action to be taken.
Figure 2:
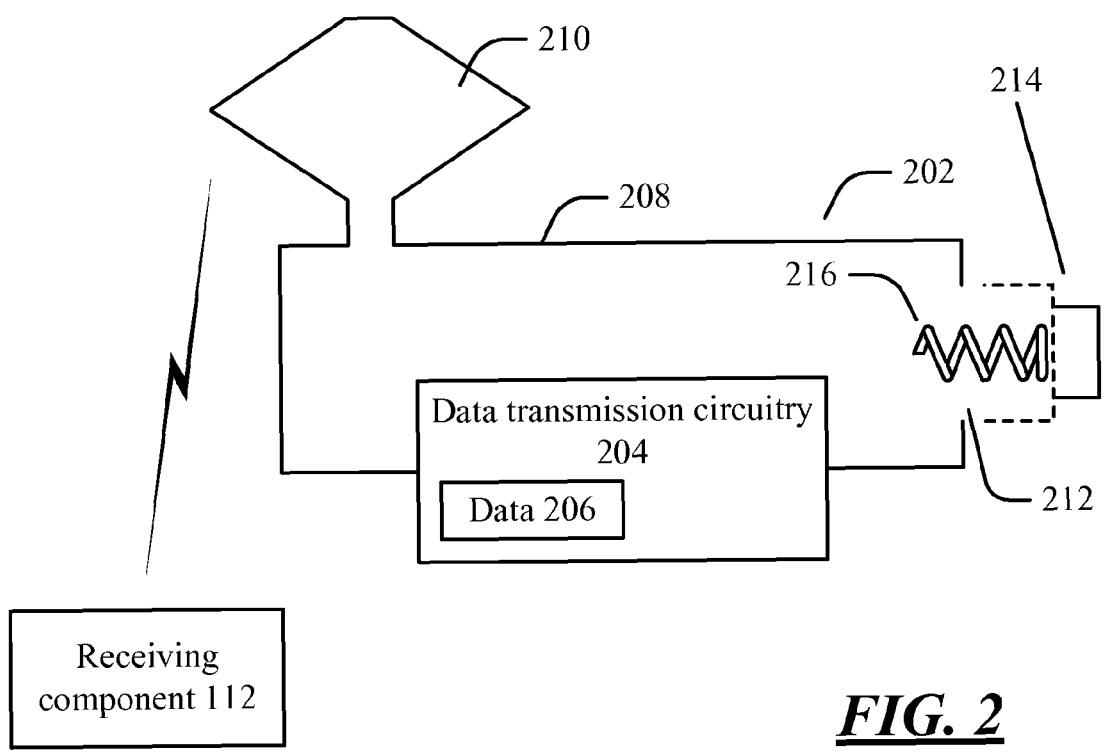
FIG. 2 is a plan view of a switched device that may transmit data when energized.

Turning now to the drawings, FIG. 1 shows an example system 100 in which switched data-transmission devices may be used to signify information and/or to cause action to be taken. Device 102 is a physical device that stores one or more items of data. In the example of FIG. 1, device 102 stores items to data 104, 106, and 108. However, device 102 could store a single item of data, or any number of items of data. Device 102 comprises a control 110 that may be used to indicate which, if any, of the items of data are to be transmitted. Transmitting of data may, for example, be based on both the operation of the control and on certain other circumstances. For example, device 102 may be an RFID device that transmits data when activated by the presence of electromagnetic waves in a certain frequency. In such an example, control 110 would determine which one(s) of items data 104, 106, and 108 are to be transmitted when energized by electromagnetic waves, and the transmission of the data selected by control 110 would occur when the electromagnetic waves are present. However, an RFID device energized by electromagnetic waves is merely one example of how device 102 could transmit data as determined by control 110. Device 102 could be activated to transmit data by other mechanisms, such as mechanical kinetic energy, etc. In one example, device 102 has a single piece of data (e.g., data 104) and control 110 comprises a binary switch that opens and closes a circuit, thereby allowing the data, when the device is energized, either to be transmitted (when the circuit is closed) or not (when the circuit is open). An example of device 102 that follows this particular model is described below in connection with FIG. 2, although FIG. 2 is merely an example of device 102. Thus, if device 102 has plural items of data, as shown in FIG. 1, then control 110 could be a selector (e.g., a dial, one or more buttons, etc.) that has plural settings allowing the device to be placed in different states, where different items of data (or combination of items of data) would be transmitted depending on the state selected. FIG. 1 shows one device 102, although there could be several devices that transmit different items of data. These items of data could be received, interpreted, and processed in the manner described below.

Receiving component 112 receives data from devices that transmit data, such as device 102. In one example, receiving component communicates wirelessly with device 102, as represented by zig-zag line 114. Receiving component 112 may broadcast energy 116, and device 102 may reflect data back when energized by energy 116. As noted above, the device may be configured to reflect one or more particular items of data, or to reflect no data at all, based on the operation of control 110. Thus, if device 102 is an RFID device, then energy 116 may be in the form of electromagnetic waves in the radio frequency, and device 102 may transmit one or more items of data, as selected by control 110, when device 102 is energized by the electromagnetic waves. Data 118 is transmitted in response to energy 116. Data 118 may, for example, comprise one or more of items of data 104, 106 and/or 108.

Receiving component 112 may receive data 118. As noted above, due to the operation of control 110, it is possible that no data would be transmitted by device 102. However, it is also possible that control 110 would be operated in such a way that data would be transmitted. If data 118 is sent, it may be received by receiving component 112. Receiving component 112 uses interpretation logic 120 to determine the meaning of data 118, and/or what action is to be taken based on receipt of data 118. An example of such interpretation logic is discussed below in connection with FIG. 3.

Receiving component 112 and interpretation logic 120 may be part of command component 122, which receives data from devices and causes action to be taken based on the received data. Command component 122 may be a computer, a part of a computer, or any type of device that causes some type of action to happen based on the data received from devices such as device 102. For example, a desktop or laptop computer, equipped with the appropriate hardware to broadcast energy 116 and to receive data 118, could be configured to control various types of equipment based on receipt of data 118. Such control might include turning on appliances, issuing play/record/rewind/etc. instructions to audio/video equipment, directing the motion of construction equipment, or any other type of action. As another example, command component 122 could be an internal or peripheral component of a computer that causes some action within the computer itself. For example, a keyboard could be built with RFID tags as keys, in which case device 102 might be a key on a computer's keyboard. The computer might include a command component 122 that polls for, and receives, the data for the various RFID tags that make up the keyboard. When the data for a particular tag is received, command component 122 may cause the binary (e.g., ASCII) code for a key's corresponding character to be inserted into the computer's input buffer. Command component 122 need not be a computer or a part of a computer. It could also be a stand-alone machine that serves as an interface between device 102 (or other similar devices) and components to be controlled. For example, command component 122 might be a box that one purchases in an electronics store in order to use device 102 to control appliances in the home. Command component 122 could take various forms, and the foregoing are merely examples.

Targets 124, 126, and 128 are machines, devices, appliances, etc., that may be controlled by command component 122, based on data received from devices like device 102. By way of example, FIG. 1 shows three targets, although there could be any number of targets. For example, target 124 may be a lamp, and the meaning assigned to data 104 may be "toggle the lamp on or off" (e.g., turn the device's power to the opposite of the state the device is currently in). Thus, if data 104 is included in the data 118 that receiving component 112 receives, then command component 122 may take, or cause to be taken, the physical actions that change the state of the lamp between on and off (e.g., by closing or opening a circuit). Similarly, if device 102 is a three-way switch where data 104, 106, and 108 have each been assigned to represent different power states (e.g., low, medium, and high), then command component 122 could set the lamp to the appropriate power state (or other kind of operational state) depending on which data has been received. In the foregoing example, target 124 is an electrical appliance and the action taken or caused by command component 122 is to power the appliance. However, a target need not be an appliance. For example, if the device that transmits data represents a key on a keyboard, then target 126 could be the input buffer of a computer or other device. As another example, the action associated with receipt of a particular item of data could simply be to store the data in a location (e.g., disk, volatile memory, etc.) for later processing, in which case the data storage location could be a target. Anything that could be acted upon in some manner by command component 122 could be a target.

FIG. 2 shows one example of a device 202 that may transmit data when energized. Device 202 comprises data transmission circuitry 204 that transmits data 206 when energized. A device employing RFID technology is an example of a device that could behave in this manner. Data transmission circuitry 204 is part of a larger electrical circuit 208 that comprises antenna 210 and switch 212. Antenna 210 receives electromagnetic waves and converts the waves into a current when such waves are present at sufficient power and within a certain range of frequency (e.g., within the radio-frequency range). Electromagnetic waves could be broadcast, for example, by receiving component 112, which could also receive the data reflected in response to the broadcast of energy.) Current flows through circuit 208 if switch 212 is closed, and does not flow if switch 212 is open.

Button 214 is a mechanism that may be used to open and close switch 212. Button 214 includes an electrically conductive material that comes in contact with the open ends of circuit 208 when button 214 is depressed, thereby closing switch 212 to complete circuit 208. Current may then flow through the part of button 214 shown in dashed lines, causing data 206 to be transmitted. When button 214 is not depressed, switch 212 is open and current does not flow through circuit 208, in which case data 206 is not transmitted. Button 214 may be mechanically biased to the non-depressed position in which switch 212 is open. Spring 216 is an example of a mechanism that may be used to bias button 214 to the non-depressed position, although any mechanism could be used.

Device 202 may be miniaturized. For example, device 202 could be implemented as a thin, flat object, in which button 214 is implemented as a layer of the object, and depression of button 214 amounts to compressing the object (e.g., by using a finger to press the object against a surface). In this case, one or more of the layers acts as button 214. Compressing the layers of the object together may introduce points of electrical connectivity between the layers, thereby completing the circuit. In one example, electrically-conductive material could be introduced into layers of flexible dielectric material, and an adhesive could be applied to a side of a layer, thereby creating an implementation of device 202 in the form of a flexible sticker. Thus, one could apply the stick to a wall, a piece of furniture, a handheld computer pointing device, or any other surface, and could operate device 202 by pressing the sticker against the surface.

FIG. 2 shows an example of a device 202 that has one piece of data 206, and can either transmit, or not transmit, that data depending on the binary state of button 214. In this case, button 214 is an example of the control 110 that is shown in FIG. 1 and discussed above. However, a device could have any type of control. Moreover, a device could have any number of items of data, and could have one or more controls to select of which item(s) of data are to be transmitted (or to select that no items of data are to be transmitted).

Figure 3:
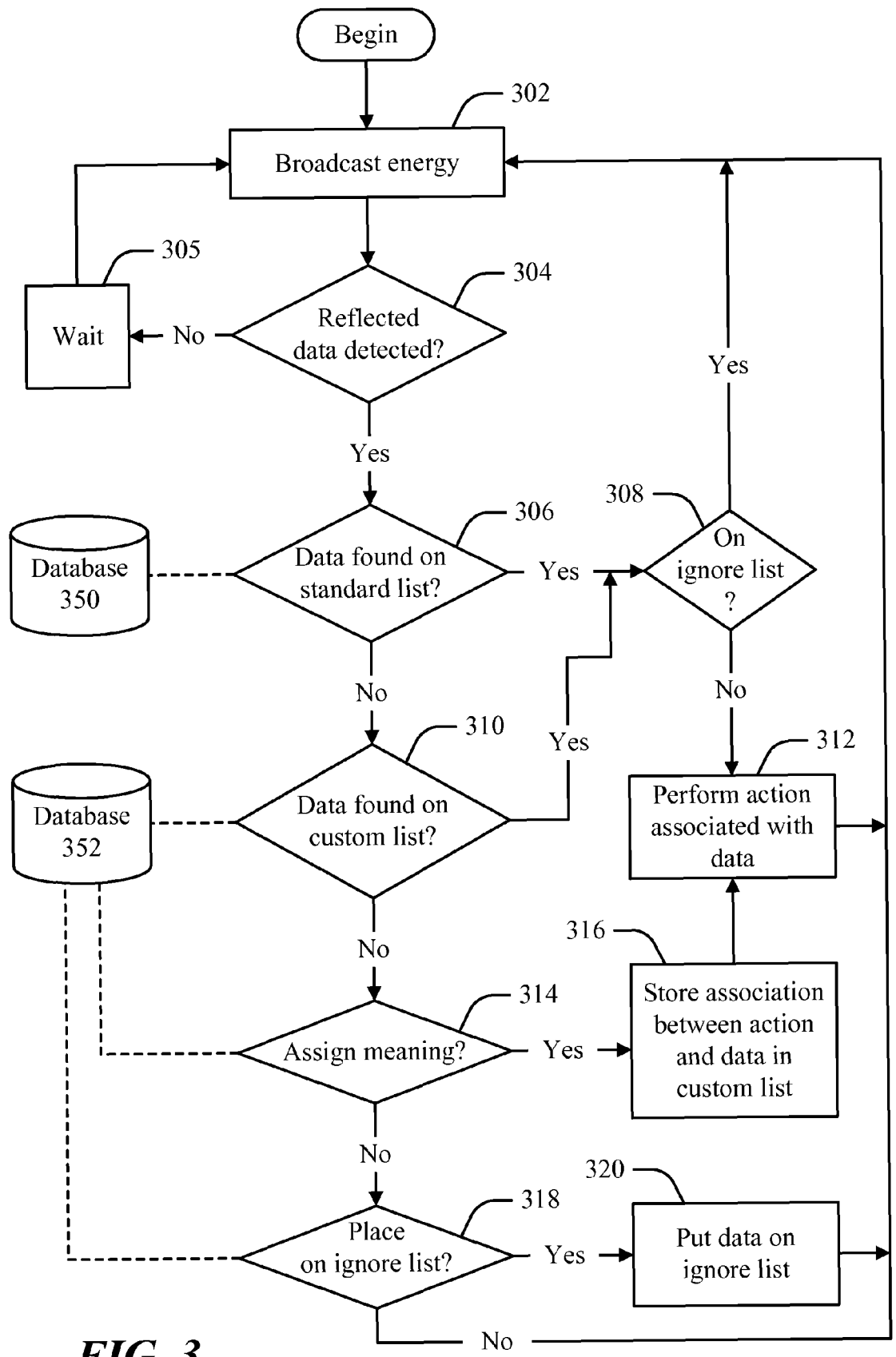
FIG. 3 is a flow diagram of a process of receiving and interpreting data from devices that transmit data.

FIG. 3 shows an example process that may be carried out to receive data from devices, and to interpret the data. This process may be carried out, for example, using components shown in FIGS. 1 and 2, but could also be carried out in any system using any components. Moreover, FIG. 3 shows an example in which stages of a process are carried out in a particular order, as indicated by the lines connecting the blocks, but the various stages may be performed in any order, or in any combination or sub-combination.

At 302, energy is broadcast. At 304, it is determined if reflected data is detected. If no reflected data is detected, then the process waits (at 305) for some amount of time, and then returns to 302 to rebroadcast energy. Broadcasting of energy may happen recurrently (at fixed or varying intervals).

If, at 304, reflected data is detected, then the process determines the appropriate action, if any, to take based on the data. At 306, the received data is looked up in, or compared with, a list of standard meanings. This list may be stored in database 350. This list may represent some published, or generally-agreed-to, understanding of what the data embedded within particular devices means. For example, a manufacturer of an appliance (e.g., a set-top optical disk player) could provide one or more RFID tags to be used as switches for the various functions on the appliance, and could register, in a public database, the particular items of data contained in these tags. The database could be available for download by machines that interpret the data (e.g., command component 122, shown in FIG. 1). Thus, the RFID tags would provide "out of the box" functionality without a user having to assign meanings to the tags, since they would have pre-assigned meanings that could be discovered. In addition to registering an individual devices of data, particular numerical ranges could have standard meanings, which could be registered in the standard list. (E.g., devices whose data falls in the range $2^{64}$ through $2^{65}-1$ might have the standard meaning of being on/off switches for lamps). Or, a specific sequence of bits (e.g., the right-most m-bit sub-sequence of an n-bit data item, where m<n) could be reserved as a code, indicating a general purpose of the rest of the data. (E.g., if the right-most eight bits are 0x100, this could signify that that the device having this data is to be used as a "play" button for audio/video equipment.)

If a meaning for a particular data item is found in the standard list, then the data may be checked against an ignore list (at 308). If a recognized data items is on the ignore list, then the process returns to 302, where it continues to broadcast energy to poll for devices. Otherwise, the action associated with the data item is performed (at 312), and the process then returns to 302 to poll for devices.

The ignore list specifies a set of data items that, if received, are to be ignored rather than used as a basis for action. The popularity of data-transmitting devices, such as RFIDs, means that the world could become "noisy" in the sense that a broadcast of energy could reflect large numbers of data items from large numbers of data-transmitting devices. Most of these data would be of no significance in a particular context. For example, if a command component is installed in a home to allow the appliances in the home to be controlled by RFID, then a burst of energy might reflect not only the RFID tags in that home, but also those in the home next door. The ignore list records those data items that are to be ignored if they are received. The ignore list could be custom-generated (e.g., the user could create a list of devices that are to be ignored). Or, there could be a public list. A user could modify the list by adding or removing device identifiers, as appropriate.

If the meaning of data is not found in a standard list, then the process may attempt to find the meaning in a custom list (at 310). Custom list may be a list of meanings associated with data items that are assigned by a particular entity (e.g., the owner of a data-transmitting device may assign a meaning to that device by associating that device's data item with a particular action to be performed). For example, a person might buy a set of switched RFID tags and assign meanings to each of the tags—e.g., each tag could be assigned to turn on a different appliance in the person's home. The person could assign meanings to the tags. For example, control component 122 (shown in FIG. 1) could provide a user interface to allow such assignments to be made. The meanings could be stored in a custom list. The custom list may be stored in database 352. FIG. 3 shows databases 350 and 352 as separate components. For example, database 350 could be a public database stored at a location remote to the control component that looks up data in it, while database 352 could be a database located locally on that component. However, databases 350 and 352 could be the same component or separate components, and could be located anywhere.

If a meaning for a given item of data is found in the custom list, then the item of data is checked against the ignore list (at 308). If the item is on the ignore list, then the process returns to 302, and otherwise proceeds to 312, as described above.

If a meaning for a given item is not found in either the standard or custom lists, then an attempt may be made to assign a meaning to the data (at 314). For example, a user could be prompted with a message such as "New device detected, ID#123456. Do you want to assign an action to this device?" If the user indicates that he or she wants to assign an action, then the user could be presented with a user interface that allows the user to enter an assignment of an action to the device. At 316, the assigned action could then be stored (e.g., in custom list, in database 352). The action could then be performed (at 312), and the process could then proceed from 312 in the manner described above.

If a user chooses (at 314) not to assign a meaning to the data item, then the user may be asked (at 318) if he or she wants to place the data item on the ignore list. If the user wishes to place the device on the ignore list, then the data item is placed on the ignore list (at 320), and the process returns to 302 to poll for devices. Otherwise, if the user does not wish to place the item on the ignore list, then the process returns to 302 without the data items having been placed on the ignore list. The ignore list may be stored in a database, such as database 352.

The stages discussed above in connection with FIG. 3 could be distributed among components shown in FIG. 1. For example, 302-305 (or some subset thereof) could be performed by receiving component 112 (shown in FIG. 1), and 306-320 (or some subset thereof) could be performed by interpretation logic 120 (shown in FIG. 1). However, these stages could be performed in any system using any components.

Figure 4:
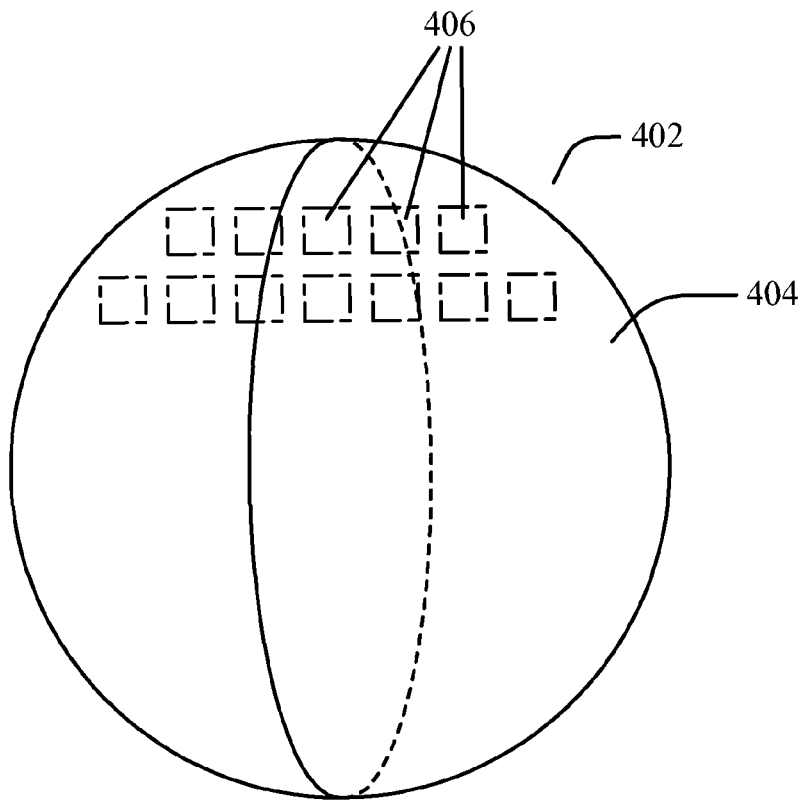
FIG. 4 is a view of a surface computing device that may be implemented using switched data-transmitting devices.
Figure 5:
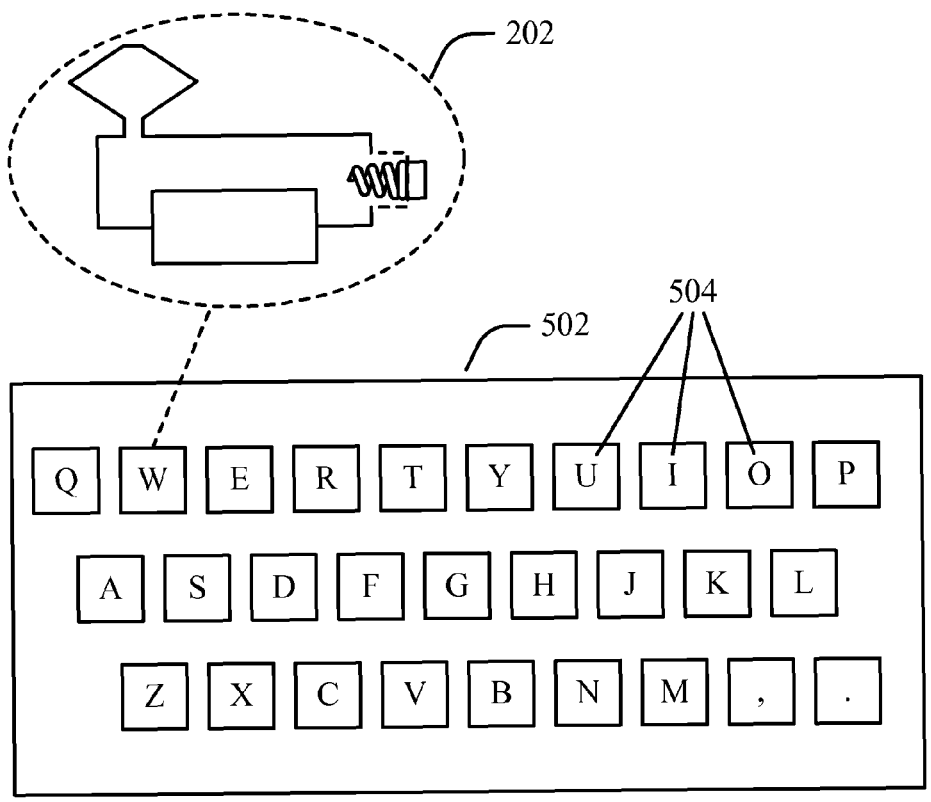
FIG. 5 is a view of a wireless keyboard that may be implemented using switched data-transmitting devices.
Figure 6:
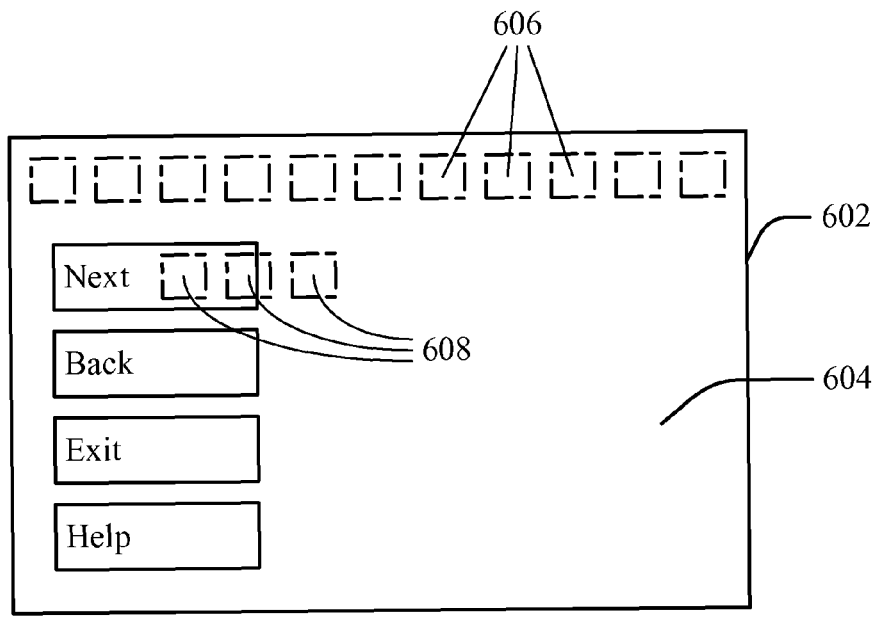
FIG. 6 is a view of a tactilely-sensitive monitor that may be implemented using switched data-transmitting devices.

The mechanisms described herein may be used to implement various types of apparatus. FIGS. 4-6 show examples of such apparatus.

FIG. 4 shows an example surface computing device 402. Surface computing device has a surface 404 on which a plurality of data transmission devices 406 are placed. In the example of FIG. 4, surface 404 is shown as a sphere, although any shape surface could be used. Data transmission devices 406 may be placed at various points throughout surface 404. Each of data transmission devices 406 may be activated by compression (e.g., pressing by a human finger), and each device may transmit a different code. If the position of each of devices 406 on surface 404 is known, then it is possible to track the movement of a human hand across surface 404 by tracking the activation of the various data transmission devices through time. Thus, surface 404 could function as a type of human interactive device that a person could use to interact with a computer. The movement of a hand, as sensed in this manner, could have various meanings. For example, the sphere could represents a wireless scroll wheel, such that rolling of the sphere in the hand could be interpreted as scrolling up, down, left, and right, depending on the direction in which the sphere was perceived as being rolled. (The direction of movement could be determined by the pattern and sequence in which various devices 406 are operated.) As another example, the sphere could represent a globe map, where touching a particular point on the globe causes a browser to open to information about a particular part of the world. The meaning or action associated with each of devices 406 could be registered, for example, in the standard or custom lists described above in connection with FIG. 3. Additionally, tags could be positioned at different layers within the space of a three-dimensional object, where the spatial position (e.g., rectilinear X, Y, and Z coordinates in three spatial dimensions) may be known for each tag. (The location of a tag may define such a spatial position.) The coordinates could be known to a receiving component, or could be transmitted by the tag as part of the data that the tag reflects. To the extent that activating tags at layers below the outer surface might call for greater degrees of applied pressure, the activation of tags at different layers might be used to sense the degree of pressure that is being applied to the outer surface.

FIG. 5 shows keyboard 502 that may operate according to mechanisms described herein. Keyboard 502 has a plurality of keys 504, where each the keys is a data-transmitting device. For example, each key could be an instance of device 202 (which is described above in connection with FIG. 2). A command component 122 (shown in FIG. 1) could recurrently poll for devices and could receive data transmitted from each of the keys 504. The action associated with each item of data received may be to put the binary code for the character corresponding to each key into an input buffer of a machine. (Thus, the "target" for each action, as shown in FIG. 1, could be the machine's input buffer.)

FIG. 6 shows an example implementation of a tactilely-sensitive (touch-screen) monitor 602. Monitor 602 has a display surface 604. A plurality of data-transmitting devices 606 are placed at various locations in the plane of the display surface. FIG. 6 shows tags arranged along a top row of display surface 604, but tags could be placed throughout the surface to allow for tactile sensitivity throughout. For example, data-transmitting devices could be a plurality of thin RFID tags that are adhered to the display surface or formed integrally within a part of the surface. These devices could be placed in the front of the surface, the back of the surface, or in between layers of the surface, such that pressing at a certain point on the display surface closes a circuit on a particular one of the plurality of tags. The tags could then be energized and read (e.g., by command component 122, shown in FIG. 1), and the receipt of a particular data item by the reader would indicate which tag is being pressed, and therefore which part of the display surface is being touched. Tags could be placed along a particular planar or non-planar surface (e.g., on a layer, or between layers). As another example, tags could be placed on any of the different layers, where the spatial position of a particular tag that has been activated may be interpreted as an indication of the pressure applied to the surface 604 of monitor 602.

For example, display surface 604 shows various on-screen buttons ("next", "back", "exit", "help"), of the type that might be displayed on a screen to facilitate human interaction with a program. Such buttons are examples of visual information that could be generated by a program whose output is being displayed on monitor 602. Pressing the portion of the screen where the button labeled "next" appears could activate one or more of data-transmitting devices 608. Based on which data-transmitting device(s) have been pressed, where they are located on display surface 604, and where the "next" button has been drawn on the screen, software may be used to determine that the user's action of touching the screen correspond to pressing the "next" button. For example, command component 122 (shown in FIG. 1) could associate each data-transmitting device with the action of reporting to a program (e.g., to the window manager, to the application has focus, etc.) the coordinates of the device(s) that was (were) activated. The program, with knowledge of where the "next" button was drawn on the screen, could then interpret that information as indicating that the "next" button has been depressed, and could then take whatever action is associated with the "next" button.

Implementing a tactilely-sensitive monitor or a surface computing device using data transmission devices, as described herein, may avoid the use of complicated wiring or machine vision to build these products, thereby reducing the cost of building such products and simplifying their respective structures.

A further example application of data-transmitting devices is for medicine. For example, medicine containers could have switched data-transmitting devices attached thereto in such a way that the act of opening the container switches the device on, and causes it to transmit an item of data in response to a broadcast of energy. A person who takes medicines could have a machine set up in his or her home to monitor the use of medicines and evaluate situations for potential drug interactions. For example, when the machine receives an item of data from the device associated with the medicine container, it may infer that the medicine container is being opened (and, therefore, that the person is taking the medicine). The machine may then evaluate that medicine against other medicines that the person has taken (e.g., based on historical times that other medicine containers have been opened). If the person is about to take a medicine that would be dangerous in combination with other medicines that the person has taken, the machine could give a warning. This scenario is yet another example of how data-transmitting devices could be used.

As a further example, data-transmitting devices, such as RFID tags, could be placed at various depths throughout a mechanical device—e.g. a prosthetic limb, a structural steel beam, or any other device. Activation of such a tag could be used to sense a degree of touch (e.g., in the case of a prosthetic hand), breakage, stress, or penetration (e.g., in the case of a structural beam), or any other type of event that involves mechanical effects or interactions.

Figure 7:
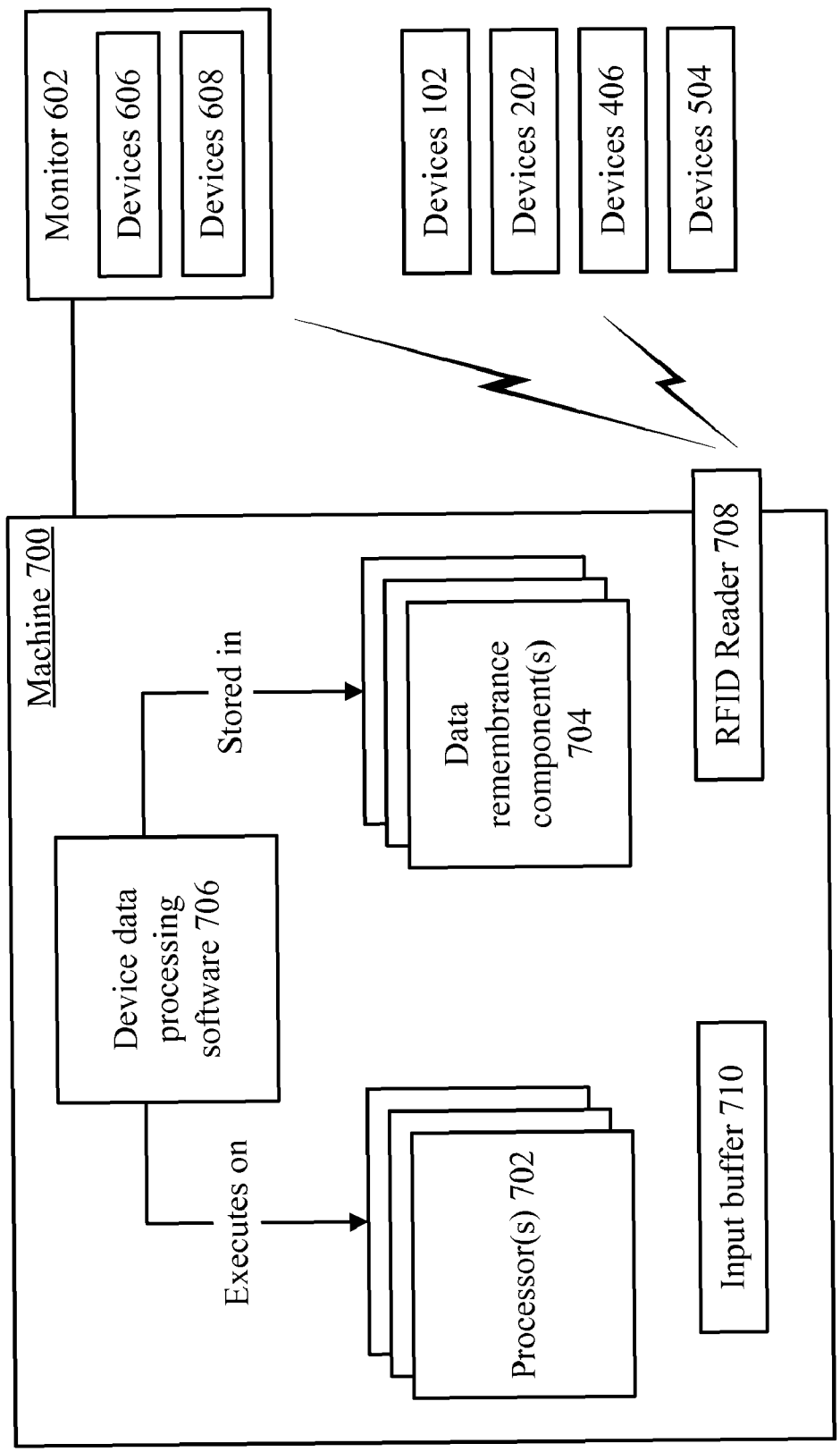
FIG. 7 is a block diagram of example components that may be used in connection with implementations of the subject matter described herein.

FIG. 7 shows an example environment in which aspects of the subject matter described herein may be deployed.

Machine 700 includes one or more processors 702 and one or more data remembrance components 704. Machine 700 may be or comprise a personal computer, server computer, or any other type of machine. As an additional example, machine 700 could be a machine whose focus is to read, interpret, and take or cause action based on data received from devices that transmit data as described herein. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Machine 700 may comprise, or be associated with, monitor 602. Monitor 602 may be a cathode ray tube (CRT) monitor, a liquid crystal display (LCD) monitor, or any other type of monitor. Monitor 602 could have features described above in connection with FIG. 6. In addition to (or as an alternative to) the tactilely-sensitive monitor shown in FIG. 6, any other type of monitor could be connected to machine 700.

Machine 700 may comprise a component that reads data from other devices. For example, machine 700 may comprise RFID reader 708, although other types of components that read data from devices could be used. This component may, for example, communicate with devices 102, 202, 406, 504, 606, and 608 (introduced in FIGS. 1, 2, and 4-6). As noted above, the mechanisms described herein may be used to implement a wireless keyboard, in which the action associated with a data-transmitting device is to place the binary code for a particular keyboard character into an input buffer. Machine 700 may comprise such an input buffer 710.

Software may be stored in the data remembrance component(s) 704, and may execute on the one or more processor(s) 702. An example of such software is device data processing software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as software having instructions to perform one or more acts, where the instructions are stored on one or more computer-readable storage media. The instructions to perform the acts could be stored on one medium, or could be spread out collectively across plural media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus for interacting with a person, the apparatus comprising:
a display surface on which visual information generated by a program is displayed;
a plurality of RFID tags arranged at locations on said display surface, each of said RFID tags comprising a switched circuit that reflects an item of data when the switched circuit is closed and energized, each of the RFID tags arranged on said display surface reflecting an item of data that differs from that reflected by each of the other RFID tags on said display surface, said switched circuit being biased to the open position and being closable by pressure applied to an RFID tag of which said switched circuit is a part; and
a component that broadcasts energy to energize circuits of said plurality of RFID tags, that reads data reflected from said RFID tags, and that communicates, to said program, a location of an RFID tag that corresponds to a reflected item of data received by said component.

2. The apparatus of claim 1, wherein said apparatus comprises a plurality of layers, said RFID tags being formed integrally within any of said plurality of layers, or being adhered to any of said plurality of layers, the location of the RFID that that corresponds to said reflected item of data defining a spatial position of said RFID tag.

3. The apparatus of claim 1, said item of data being n bits long, there being an m-bit sub-sequence of said item of data that identifies an action, where m<n.

4. The apparatus of claim 1, said component broadcasting energy an additional time after reading data reflected from said RFID tags, said component not receiving reflections from said RFID tags after having broadcasted the energy said second time.

5. The apparatus of claim 1, each of said RFID tags having two or more settings, a first of said settings indicating that a first code is to be transmitted in response to said energy, a second of said settings indicating that a second code is to be transmitted in response to said energy, said second code being different from said first code.

6. A method of using an apparatus to interact with a person, the method comprising:
using a display surface to display visual information generated by a program;
using a plurality of RFID tags to reflect items of data, said RFID tags being arranged at locations on said display surface, each of said RFID tags comprising a switched circuit that reflects an item of data when the switched circuit is closed and energized, each of the RFID tags arranged on said display surface reflecting an item of data that differs from that reflected by each of the other RFID tags on said display surface, said switched circuit being biased to the open position and being closable by pressure applied to an RFID tag of which said switched circuit is a part; and using a component to broadcast energy to energize circuits of said plurality of RFID tags, to read data reflected from said RFID tags, and to communicate, to said program, a location of an RFID tag that corresponds to a reflected item of data received by said component.

7. The method of claim 6, wherein said apparatus comprises a plurality of layers, said RFID tags being formed integrally within any of said plurality of layers, or being adhered to any of said plurality of layers, the location of the RFID that that corresponds to said reflected item of data defining a spatial position of said RFID tag.

8. The method of claim 6, said item of data being n bits long, there being an m-bit sub-sequence of said item of data that identifies an action, where m<n.

9. The method of claim 6, further comprising:
using said component to broadcast energy an additional time after reading data reflected from said RFID tags, said component not receiving reflections from said RFID tags after having broadcasted the energy said second time.

10. The method of claim 6, each of said RFID tags having two or more settings, a first of said settings indicating that a first code is to be transmitted in response to said energy, a second of said settings indicating that a second code is to be transmitted in response to said energy, said second code being different from said first code.

* * * * *